2 Sheets--Sheet 1.

S. H. WOODS.

Improvement in Dies for Making Shears.

No. 5,127. Reissued Oct. 29, 1872.

Witnesses:
A. H. Harris
Wm. J. Dayton.

Inventor:
Solomon H. Woods
By Van Santvoord & Hauff.
Attys.

AM. PHOTO-LITHOGRAPHIC CO. N.Y. (OSBORNE'S PROCESS.)

2 Sheets--Sheet 2.

S. H. WOODS.

Improvement in Dies for Making Shears.

No. 5,127. Reissued Oct. 29, 1872.

*Witnesses:*
A. Notte
Wm. J. Payton.

*Inventor:*
Solomon H. Woods
By Van Santvoord & Huff.
Attys.

AM. PHOTO-LITHOGRAPHIC CO. N.Y. (OSBORNE'S PROCESS.)

UNITED STATES PATENT OFFICE.

SOLOMON H. WOODS, OF BERLIN, CONNECTICUT, ASSIGNOR OF ONE-HALF INTEREST TO RUSSELL S. GLADWIN.

IMPROVEMENT IN DIES FOR MAKING SHEARS.

Specification forming part of Letters Patent No. 97,015, dated November 16, 1869; reissue No. 5,127, dated October 29, 1872.

*To all whom it may concern:*

Be it known that I, SOLOMON H. WOODS, of Berlin, in the county of Hartford and State of Connecticut, have invented a new and useful Improvement in the Manufacture of Shears; and I do hereby declare the following to be a full, clear, and exact description thereof sufficient to enable those skilled in the art to make and use the same, reference being had to the accompanying drawing forming part of this specification, in which drawing—

Figure 1:
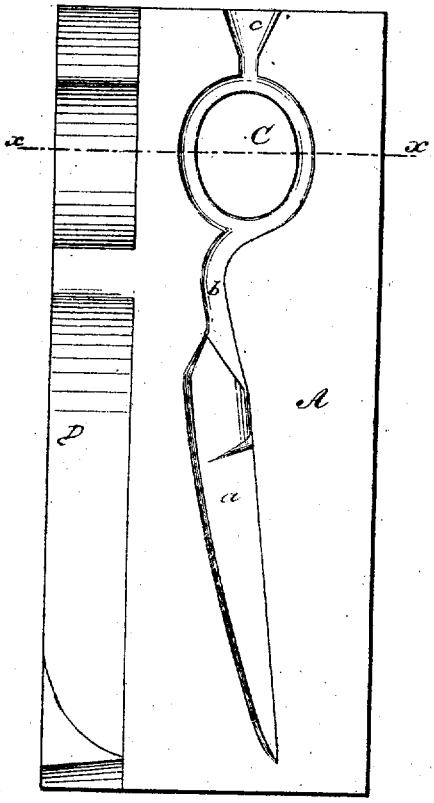
Figure 2:
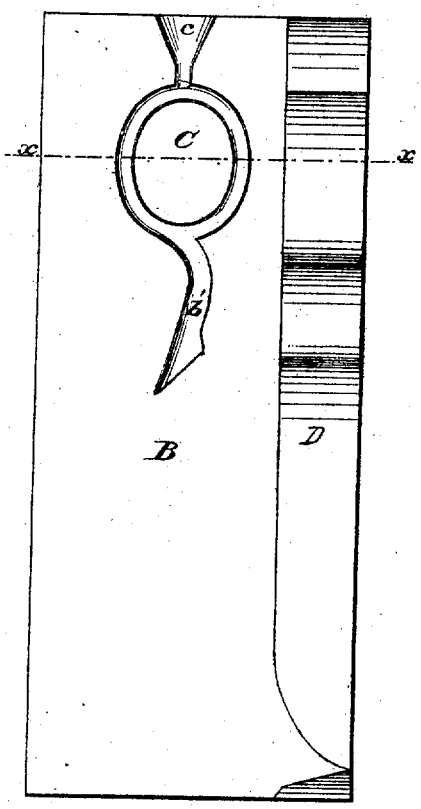
Figure 3:
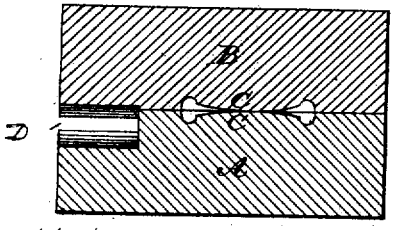
Figure 4:
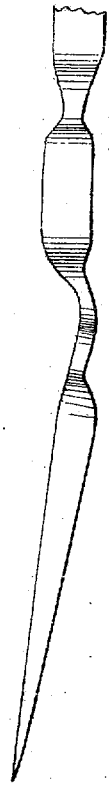
Figure 5:
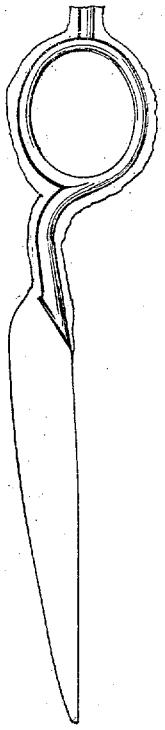
Figure 6:
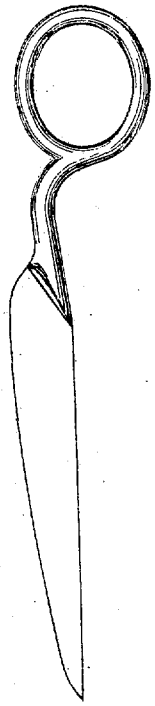
Figure 7:
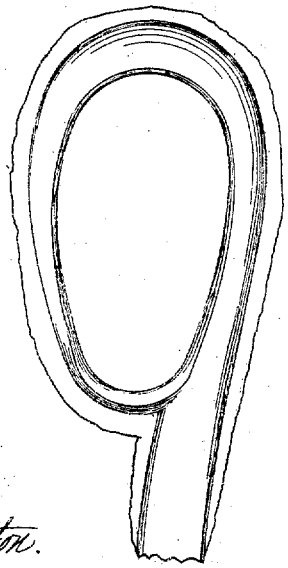
Figure 8:
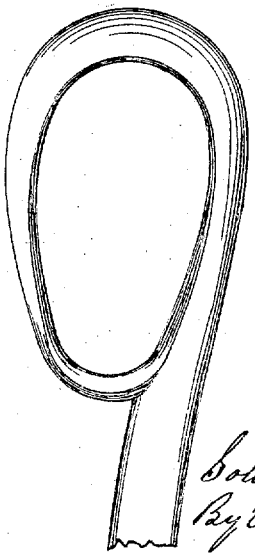

Figure 1 illustrates a face view of the lower drop and the edge or drawing dies which I employ in carrying out my invention. Fig. 2 is a face view of the upper drop-die and the edge or drawing die. Fig. 3 is a transverse section of the above-named dies when the same are placed together, the lines *x x* indicating the plane of section. Fig. 4 illustrates a blank after it is swaged or forged, and before it is operated upon by the drop-dies. Fig. 5 illustrates the blank after being subjected to the action of the drop-dies and before acted upon by trimming-dies. Fig. 6 illustrates a completed shear-blade, the same having been produced by the action of the edge or drawing dies, the drop-dies, and trimming-dies. Fig. 7 illustrates the handle or bow of shears as separately formed from a blank by my invention before being subjected to the action of trimming-dies. Fig. 8 is a view of a completed handle or bow after being submitted to the action of trimming-dies.

Like letters of reference indicate corresponding parts in each of the several figures.

This invention consists in manufacturing wrought-metal shears by first forging a blank of suitable shape by means of edge or drawing dies, and then exposing the blank thus produced to the action of drop-dies in such a manner that an article of superior quality can be produced at a price much below the present market value.

In the drawing, the letters A B represent the drop-dies, which serve to give form to the shears. The lower drop-die A is provided with an indentation, *a b*, sunk in its surface. The portion *a* of this indentation receives the blade, and the other portion *b* the handle, of one of the shear-blades to be produced. The upper die B is provided with an indentation, *b'*, corresponding exactly to the portion *b* of the indentation in the lower die A, while that portion of the upper die which corresponds to the indentation *a* in the lower die is left flat, the blade of the shear being formed entirely upon one side, as previously stated. In the end of each of the dies is a groove, *c*, for the purpose of admitting the rod to which the blank is attached. Before the blank is exposed to the action of the drop-dies it is brought to about the shape shown in Fig. 4 by means of the edge or drawing dies D, or by forging or otherwise, after which the same is ready for the action of the drop-dies. The bows or eyes of the handles are produced by the portion C C of the drop-dies, Figs. 1, 2, and 3, and these portions may be flat or they may be convex, as shown in Fig. 3, in order to facilitate the operation and more effectually spread the metal for the formation of the eyes.

After the blank has passed through the drop-dies A B there will be a thin film of metal around the edges and across the eye of the handle, as in Figs. 5 and 7, and this film is removed by passing the article through a set of trimming-dies, which cut away all the superfluous metal and leave the article ready for finishing, as in Figs. 6 and 8; but such trimming is disclaimed in this application.

In shears or scissors where both parts are alike such parts can be made in the same sets of dies, and by placing the flat portions of the blades together they are brought into position for riveting. For shears, however, where the handles and blades are of different dimensions, two sets of dies must be used—one set for each part.

It is obvious that this process is applicable for the manufacture of shears or scissors of any description, and the drop-dies may form simply the eye or bow of the handle upon the bar of the metal.

I do not claim, broadly, a die for forming the blade of scissors, as such is not new; but

What I claim as new, and desire to secure by Letters Patent, is—

The face-dies A B, for forming scissors or shears from a wrought blank, substantially as described, with or without the edge-dies D D, as set forth.

SOLOMON H. WOODS.

Witnesses:
GEO. W. SMITH,
H. D. BEEBE.